(12) United States Patent
Kawasaki et al.

(10) Patent No.: US 9,189,065 B2
(45) Date of Patent: Nov. 17, 2015

(54) SIDE-TYPE FORCE SENSE INTERFACE

(75) Inventors: Haruhisa Kawasaki, Gifu (JP); Takahiro Endo, Gifu (JP); Tetuya Mouri, Gifu (JP); Hisashi Aoyama, Gifu (JP)

(73) Assignee: Gifu University, Gifu-ken (JP)

( * ) Notice: Subject to any disclaimer, the term of this patent is extended or adjusted under 35 U.S.C. 154(b) by 264 days.

(21) Appl. No.: 13/993,957

(22) PCT Filed: Nov. 30, 2011

(86) PCT No.: PCT/JP2011/077660
§ 371 (c)(1),
(2), (4) Date: Jun. 13, 2013

(87) PCT Pub. No.: WO2012/081402
PCT Pub. Date: Jun. 21, 2012

(65) Prior Publication Data
US 2013/0278500 A1    Oct. 24, 2013

(30) Foreign Application Priority Data

Dec. 17, 2010    (JP) ................................ 2010-281856

(51) Int. Cl.
*G06F 3/01*    (2006.01)
*B25J 13/02*    (2006.01)
(Continued)

(52) U.S. Cl.
CPC . *G06F 3/014* (2013.01); *B25J 3/04* (2013.01); *B25J 13/02* (2013.01); *B25J 13/085* (2013.01); *B25J 15/0009* (2013.01)

(58) Field of Classification Search
CPC ...... B25J 13/02; B25J 15/0009; B25J 13/085; B25J 3/04; G06F 3/014

USPC ........... 340/407.1; 318/2, 628; 345/156, 184; 700/245–264; 901/2
See application file for complete search history.

(56) References Cited

U.S. PATENT DOCUMENTS 5,587,937 A    12/1996    Massie et al.
6,413,229 B1 *    7/2002    Kramer et al. ............... 600/595
(Continued)

FOREIGN PATENT DOCUMENTS

EP    574919 A2 *    12/1993
JP    09216183 A *    8/1997
(Continued)

OTHER PUBLICATIONS

Kawai, Masayuki, et al., Stable Haptic Display of 1-DOF Grasping with Coupling Impedance for Internal and External Forces, *Proceedings of the 2000 IEEE/RSJ International Conference on Intelligent Robots and Systems*, pp. 1316-1321 (2000).
(Continued)

*Primary Examiner* — Amare Mengistu
*Assistant Examiner* — Stacy Khoo
(74) *Attorney, Agent, or Firm* — Christensen Fonder P.A.

(57) ABSTRACT

A force sense interface includes a tactile finger base having a plurality of tactile fingers, which are capable of tracking motions of the fingers of a hand of an operator, an arm mechanism, which allow spatial motion of the tactile finger base, and a controller, which controls the arm mechanism in accordance with the position and posture of the hand, and controls the tactile fingers in accordance with the movements of the fingers of the operator. The force sense interface further includes finger holders for attaching the tactile fingers on the fingers of the operator in a state where the tactile finger base is distanced from the back of the hand of the operator (H) so as to face the back of the hand.

7 Claims, 5 Drawing Sheets

(51) Int. Cl.
*B25J 3/04* (2006.01)
*B25J 13/08* (2006.01)
*B25J 15/00* (2006.01)

(56) References Cited

U.S. PATENT DOCUMENTS

2003/0146898 A1* 8/2003 Kawasaki et al. ............. 345/156
2005/0179644 A1* 8/2005 Alsio et al. .................... 345/156
2009/0102620 A1 4/2009 Kato et al.
2012/0154131 A1* 6/2012 Lee et al. .................... 340/407.1

FOREIGN PATENT DOCUMENTS

| JP | 2002-182817 A | 6/2002 |
| JP | 2003-300188 A | 10/2003 |
| JP | 3612085 B2 * | 1/2005 |
| JP | 2007-316936 A | 12/2007 |
| JP | 2009-116848 A | 5/2009 |
| JP | 2010-146307 A | 7/2010 |

OTHER PUBLICATIONS

Wall, Steven A., et al., "Design of a Multiple Contact Point Haptic Interface," *Proceedings of EuroHaptics2001*, 4 pgs. (2001).
CyberGlove Systems, "CyberGrasp System Overview", [online], Searched on Dec. 17, 2010, Internet <URL: http://www.cyberglovesystems.com/products/cybergrasp/overview.
Frisoli, Antonio, et al., "Kinematic Design of a Two Contact Points Haptic Interface for the Thumb and Index Fingers of the Hand," *ASME Journal of Mechanical Design*, vol. 129, pp. 520-529 (May 2007).

* cited by examiner

SIDE-TYPE FORCE SENSE INTERFACE

RELATED APPLICATIONS

The present is a National Phase entry of PCT Application No. PCT/JP2011/077660, filed Nov. 30, 2011, which claims priority from Japanese Patent Application No. 2010-281856, filed Dec. 17, 2010, the disclosures of which are hereby incorporated by reference herein in their entirety.

FIELD OF THE INVENTION

The present invention relates to a side-type force sense interface.

BACKGROUND OF THE INVENTION

Conventionally, a serial link type force sense providing device (refer to Patent Document 1) and a parallel link type force sense providing device (refer to Patent Document 2) have been proposed as force sense providing devices, which provide a sense of resistance and a sense of weight to a hand or a point on a finger when touching a virtual object in a virtual space. Although the force sense providing device provides a force sense to a single position, it is difficult to provide a force sense to a plurality of fingertips of a person.

In contrast, devices disclosed in Patent Document 3 and Non-Patent Documents 1 to 4 have been proposed as force sense providing devices, which provide a force sense to a plurality of the fingertips of the person.

In the device disclosed in Non-Patent Document 1, two serial link type force sense providing devices are provided and configured to provide a force sense to two of the fingertips. Further, in the device disclosed in Non-Patent Document 2, three serial link type force sense providing devices are provided and configured to provide the force sense to three of the fingertips.

However, in the devices of a type in which a plurality of force sense providing devices are provided, there is a problem that an operational space becomes extremely narrow. It is difficult to provide three or more force sense providing devices due to interference among the force sense providing devices. Accordingly, it is difficult to provide a force sense to the five fingertips. In the devices of the type in which a plurality of the force sense providing devices are provided, a device with a large operational space, which provides the force sense to five fingertips of a person, has not been researched or developed.

In the device disclosed in Non-Patent Document 3, wires connected to the fingertips are pulled to provide a force sense to five fingertips. However, in the force sense providing device of Non-Patent Document 3, the force sense that can be provided is only in a single axial direction in which the fingertips are pulled by the corresponding wires. Also, in a device disclosed in Non-Patent Document 4, an arm of a person is equipped with two serial link type force sense providing devices. The two serial link type force sense providing devices are brought into contact with two of the fingertips of the operator such that a three-dimensional force sense is provided to two fingertips.

The devices disclosed in Non-Patent Documents 3 and 4 are wearable force sense providing devices worn by a hand or an arm of a person when used. In this case, since the device that provides a force sense is worn by a hand or an arm of a person, it is difficult to provide a sense of weight of a virtual object to the person. The device gives the person oppression and a sense of weight of the device. Since the device is worn by a hand or an arm, unexpected force may be applied to the operator when the mechanism of the device loses control.

In contrast, in a multi-finger force sense providing device of Patent Document 3, a robot arm and a robot hand are used such that the three-dimensional force sense is provided to the five fingertips of a person. In the multi-finger force sense providing device, the robot hand is provided to face the person. Accordingly, the device is different from the wearable force sense providing device and safe. Further, in the multi-finger force sense providing device of Patent Document 3, a larger operational space is ensured by the movement of the robot arm.

PRIOR ART DOCUMENTS

Patent Documents

Patent Document 1: U.S. Pat. No. 5,587,937
Patent Document 2: Japanese Laid-Open Patent Publication No. 2010-146307
Patent Document 3: Japanese Laid-Open Patent Publication No. 2003-300188

Non-Patent Documents

Non-Patent Document 1: M. Kawai and T. Yoshikawa, "Stable Haptic Display of 1-DOF Grasping with Coupling Impedance for Internal and External Forces", Proceedings of 2000 IEEE/RSJ International Conference, Intelligent and Robots Systems), 2000, pp. 1316 to
Non-Patent Document 2: S. Wall and W. Harwin, "Design of a Multiple Contact Point Haptic Interface", Proceedings of EuroHaptics 2001, 2001
Non-Patent Document 3: CyberGlove Systems, "Cyber-Grasp System Overview", [online], [Searched on Dec. 17, 2010], Internet <URL:http://www.cyberglovesystems.com/products/cybergrasp/overview>
Non-Patent Document 4: A. Frisoli, F. Simoncini, M. Bergamasco, and F. Salsedo, "Kinematic Design of a Two Contact Points Haptic Interface for the Thumb and Index Fingers of the Hand", (ASME Journal of Mechanical Design), Volume 129, 2007, pp. 520 to 529

SUMMARY OF THE INVENTION

However, in the multi-finger force sense providing device of Patent Document 3, when a small virtual object is grasped or operated, interference of a mechanism that configures a multi-finger force sense providing device is caused. Accordingly, there is a problem that it is difficult to treat small virtual objects.

An object of the present invention is to provide a side-type force sense interface with a large operational space that provides a three-dimensional force sense and a sense of weight of a virtual object to each finger of a person without giving a sense of oppression or weight of the device, is safe, and is capable of treating small virtual objects.

Another object of the present invention is to provide a side-type force sense interface that allows an operator to perform a delicate, elaborate, and adroit operation using fingers of both hands.

To achieve the above described objects, according to an aspect of the present invention, a side-type force sense interface is provided on a side of an operator, which provides a force sense to each of fingers of the operator. The interface includes: a tactile finger base having one to five tactile fingers, an arm mechanism, a controller, a first detection portion, and a second detection portion. The tactile finger base can follow movement of the fingers of the operator. The arm mechanism enables spatial movement of the tactile finger base. The controller controls the arm mechanism in accordance with a position and a posture of a hand of the operator and controls the tactile fingers in accordance with movement of the fingers of the operator. The first detection portion detects a position and a posture of a wrist of the operator. The arm mechanism has a wrist joint corresponding to the wrist of the operator. The second detection portion detects a position and a posture of the wrist joint of the arm mechanism. One to five finger attachment portions are provided on the tactile fingers. The finger attachment portions are attached to the fingers of the operator in a state in which the tactile fingers and the tactile finger base face the back of the hand of the operator and are spaced apart from the back. Based on a detection result of the first detection portion and a detection result of the second detection portion, the controller computes an evaluation function for avoiding interference between the wrist of the operator and the wrist joint of the arm mechanism except for the finger attachment portions and controls the arm mechanism on the basis of a computation result of the evaluation function.

It is preferable that the controller controls the arm mechanism such that the evaluation function becomes maximized.

It is preferable that each finger attachment portion includes a part that is brought into contact with a ball portion of each of the fingers of the operator, and a protrusion is formed on the part in contact with the ball portion of each of the fingers such that force is applied to the ball portion of each of the fingers in a concentrated manner.

It is preferable that each finger attachment portion includes a rollable joint ball provided on a distal portion of each of the tactile fingers, and a finger holder connected to the joint ball and to a fingertip of the operator.

It is preferable that an attracting portion, which holds the joint ball by attraction, is provided in each of the tactile fingers.

It is preferable that each attracting portion includes a magnetic force generating portion, which holds the joint ball by attracting the joint ball with magnetic force.

According to another aspect of the present invention, a side-type force sense interface including a first force sense interface and a second force sense interface is provided on each of sides of an operator. Each of the first and the second force sense interfaces provides a force sense to fingers of a hand of the operator. The first force sense interface is for the right hand of the operator, and the second force sense interface is for the left hand of the operator. Each of the first and the second force sense interfaces includes: a tactile finger base having one to five tactile fingers, an arm mechanism, a controller, a first detection portion, and a second detection portion. The tactile finger base can follow movement of the fingers of the operator. The arm mechanism enables spatial movement of the tactile finger base. The controller controls the arm mechanism in accordance with a position and a posture of the corresponding hand of the operator, and controls the tactile fingers in accordance with movement of the corresponding fingers of the operator. The first detection portion detects a position and a posture of a wrist of the operator. The second detection portion detects a position and a posture of the wrist joint of the arm mechanism. The arm mechanism has a wrist joint corresponding to the wrist of the operator. One to five finger attachment portions are provided on the tactile fingers. The finger attachment portions are attached to the fingers of the operator in a state in which the tactile fingers and the tactile finger base face the back of the corresponding hand of the operator and are spaced apart from the back. Based on a detection result of the first detection portion and a detection result of the second detection portion, the controller computes an evaluation function for avoiding interference between the wrist of the operator and the wrist joint of the arm mechanism except for the finger attachment portions and controls the arm mechanism on the basis of a computation result of the evaluation function.

Effects of the Invention

According to the first aspect of the present invention, the tactile fingers are attached to the fingers of the operator in a state in which the tactile fingers and the tactile finger base are spaced apart from the back of the hand. The operational space for the operator is enlarged by the movement of the arms. Further, a three-dimensional force sense and a sense of weight of a virtual object are securely provided to each of a plurality of the fingers of a person without giving a sense of oppression and a sense of weight of a device, and a small virtual object can be treated. Since the connection between the operator and the force sense interface is performed by only fingertips, the operator is protected from feeling a sense of restraint or a sense of weight of the interface.

Based on the detection result of the first detection portion and the detection result of the second detection portion, the controller computes the evaluation function for avoiding interference between the hand of the operator and the arm mechanism except for the finger attachment portions. As a result, on the basis of the computed result of the evaluation function, interference between the arm mechanism and the hand of the operator is avoided.

By controlling the arm mechanism such that the evaluation function becomes maximized, interference between the arm mechanism and the hand of the operator is avoided.

The protrusion provided on the finger attachment portion contacts the ball portion of the finger of the operator such that force is concentrated on and applied to the ball portion of the finger. Accordingly, a clear three-dimensional force sense is provided to the ball portion of the finger of the operator.

The joint ball allows the posture of the fingertip to be changed at the same fingertip position. Accordingly, each of the tactile fingers is smoothly coupled with the operator.

The attracting portion, which attracts and holds the joint ball, is provided in the tactile finger. As a result, the attracting portion attracts and holds the joint ball. When excess tensile force is applied to the finger of the operator, the joint ball is automatically released from the tactile finger such that the tensile force is not applied to the finger of the operator. Accordingly, the connection between the tactile finger and the finger attachment portion is securely released such that the operator can operate the sense force interface with a sense of ease.

The attracting portion includes a magnetic force generating portion, which holds the joint ball by the attraction of the magnetic force. As a result, the joint ball is held by the magnetic force, and the joint ball is automatically released from each of the tactile fingers when the excess tensile force is applied to the finger of the operator.

According to the second aspect of the present invention, a pair of force sense interfaces is provided on the sides of the operator. Accordingly, a three-dimensional force sense is provided to the fingers of both hands of the operator. Thereby, in a remote control and a virtual environment, a force sense providing device, which enables delicate, elaborate, and adroit operations using fingers of both hands, is provided.

DETAILED DESCRIPTION OF THE PREFERRED EMBODIMENTS

A side-type force sense interface (hereinafter, referred to simply as sense force interface) according to one embodiment of the present invention will be described with reference to FIGS. 1 to 8.

Figure 1:
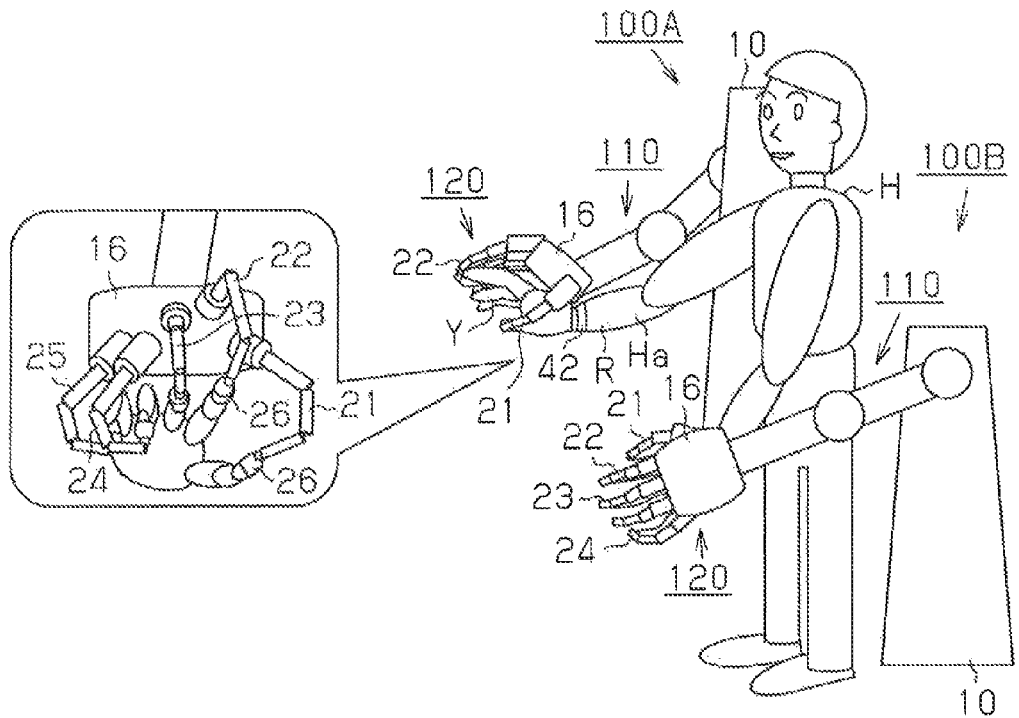
FIG. 1 is a schematic diagram showing a force sense interface according to an embodiment of the present invention.
Figure 3:
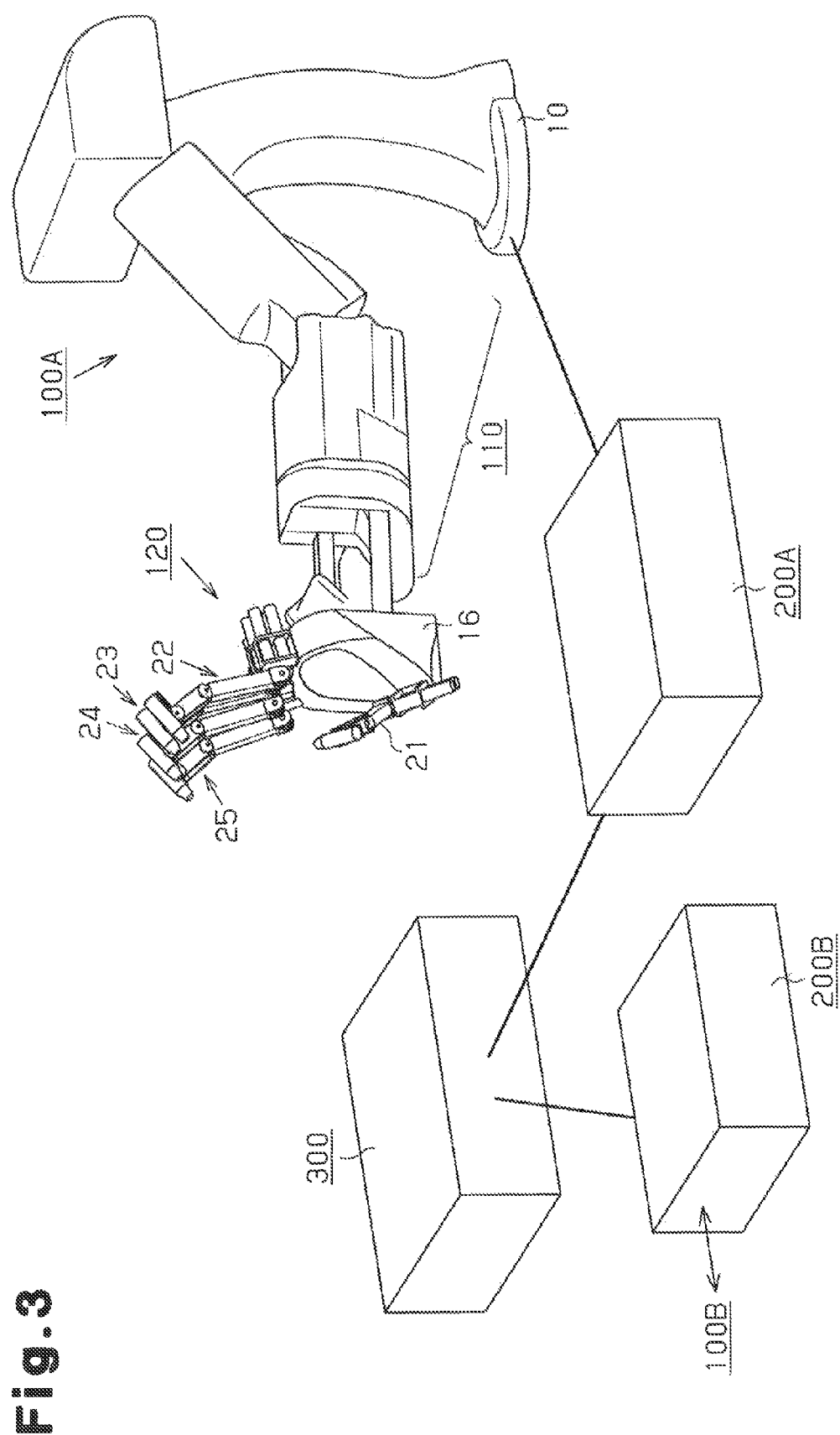
FIG. 3 is a view illustrating a force sense providing system.

As shown in FIGS. 1 and 3, a force sense providing system includes a pair of interfaces 100A and 100B each installed on each side of an operator H, i.e., on both sides, and controllers 200A and 200B, which control corresponding drive motors (not shown) of the interfaces 100A and 100B, respectively. The interface 100A provides a three-dimensional force sense on a ball of each of the five fingers of the right hand of an operator H. The interface 100B provides a three-dimensional force sense on a ball of each of the five fingers of the left hand of an operator H. The system is electrically and communicatively connected with an operation object portion 300 that is electrically connected with each of the controllers 200A and 200B. The operation object portion 300 is configured by a virtual environmental system or a slave robot.

In the force sense providing system, when the operation object portion 300 is a virtual environmental system, each of the interfaces 100A and 100B provides sense of resistance and sense of weight when touching a virtual object in the virtual environmental system to the operator. When the operation object portion 300 includes a slave robot, the operator can operate the slave robot remotely by the interfaces 100A and 100B. The sense force when the slave robot touches an object is provided to the operator by the interfaces 100A and 100B.

In the present embodiment, the operation object portion 300 is configured by a slave robot (not shown) and a slave robot controller (not shown) that controls the slave robot.

<Interfaces 100A and 100B>

As shown in FIG. 1, since the interfaces 100A and 100B are different from each other in that the configurations of interface hands 120 of the respective interfaces 100A and 100B are slightly different from each other. Accordingly, hereinafter, the interface 100A for a right hand will be specifically described with reference to FIGS. 1 to 7. As for the configuration of the interface 100B for a left hand, the same reference numerals are given to the configurations the same or corresponding to the configurations of the interface 100A.

As shown in FIGS. 1 and 3, the interface 100A includes an arm mechanism 110 located on a base 10, and an interface hand 120 provided at a distal end of the arm mechanism 110.

Figure 2:
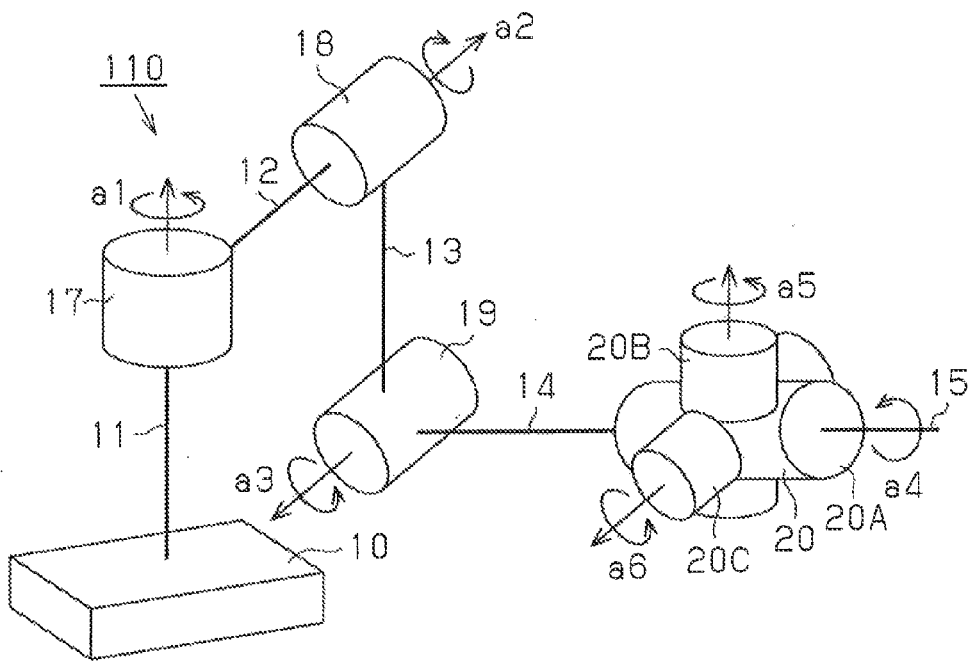
FIG. 2 is a view schematically showing a principle of an arm mechanism.

As shown in FIG. 2, the arm mechanism 110 has a plurality of arms 11 to 15 connected by joints.

In the present embodiment, in the arm mechanism 110, a second arm 12 is connected to a first arm 11 via a first joint 17. The first arm 11 is connected to the base 10. The first joint 17 actively rotates about an axis a1 that is coaxial with the first arm 11. Since FIG. 1 is a schematic diagram, some of the arms of the arm mechanism 110 are omitted such that the arm mechanism 110 is illustrated in a simplified manner.

A third arm 13 is connected to the second arm 12 via a second joint 18. The second joint 18 actively rotates about an axis a2 that is coaxial with the second arm 12. A fourth arm 14 is connected to the third arm 13 via a third joint 19. The third joint 19 actively rotates about an axis a3 that is perpendicular to an axis of the third arm 13. A fourth arm 14 is arranged to be perpendicular to the axis a3.

Figure 4:
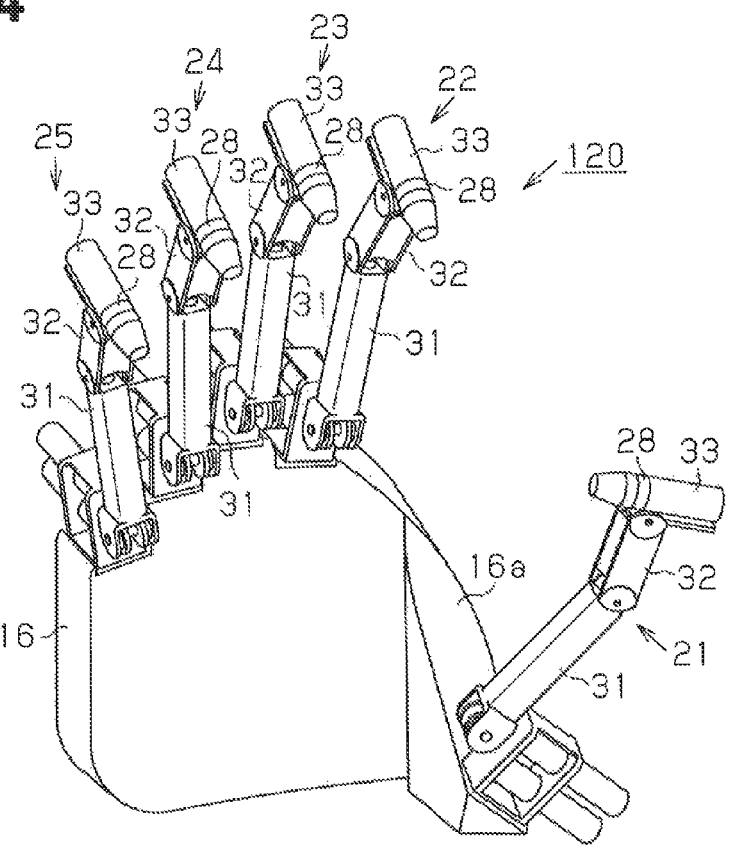
FIG. 4 is a schematic diagram illustrating an interface hand of the force sense providing system of FIG. 3.

A fifth arm 15 is connected to the fourth arm 14 via a joint portion 20. The joint portion 20 is configured by a fourth joint 20A, a fifth joint 20B, and a sixth joint 20C. The joint portion 20 corresponds to a wrist of the arm mechanism 110, namely, an interface (interface hand 120). The fourth to sixth joints 20A to 20C respectively actively rotate about axes a4, a5, and a6, which are perpendicular to each other. The axis a4 is arranged to be coaxial with the fourth arm 14. A tactile finger base 16 of the interface hand 120 shown in FIG. 4 is connected to a distal end of the fifth arm 15.

The first joint 17 to sixth joint 20C are independently driven by corresponding drive motors and gear reducers, which are not illustrated. The first joint 17 to the sixth joint 20C rotate about the above described axes a1 to a6 by controlling each drive motor.

Accordingly, the arm mechanism 110 of the present embodiment has six degrees of freedom with the first joint to the sixth joint.

Further, rotary encoders ARE1 to ARE6 as a second detection portion that detects rotation angles of the axes a1 to a6, which will be described below, are provided in the drive motors (not shown) of the first joint 17 to sixth joint 20C. The rotation angles of the above described axes a1 to a6 are detected by these rotary encoders ARE1 to ARE6, respectively.

<Interface Hand 120>

Next, the interface hand 120 for a right hand will be described below.

As shown in FIG. 4, the tactile finger base 16 of the interface hand 120 is sized to cover the back of the right hand of a person. An extended portion 16a extends from a lateral portion of the tactile finger base 16 corresponding to a first finger (thumb) of the right hand when the tactile finger base 16 is arranged to face the back of the right hand of the person. A first tactile finger 21 is coupled to the distal end of the extended portion 16a. Also, four tactile fingers, namely, a second tactile finger 22 to a fifth tactile finger 25 are coupled to another distal end of the tactile finger base 16. The above described first tactile finger 21 to the fifth tactile finger 25 are arranged on the tactile finger base 16 such that the first tactile finger 21 to the fifth tactile finger 25 can be respectively attached to the first finger to the fifth finger of the right hand of the person to face the back of the right hand.

An extended portion 16a is formed in an interface hand 120 for a left hand, in which the extended portion 16a extends from a lateral portion of the tactile finger base 16 corresponding to the first finger (thumb) of the left hand when the tactile finger base 16 is arranged to face the back of the left hand of the person. The order of arranging the first tactile finger 21 to the fifth tactile finger 25 is reverse to that of the interface hand 120 for a right hand. The interface hand 120 for a left hand has a symmetrical structure with respect to the interface hand 120 for a right hand.

Accordingly, in the interfaces 100A and 100B, each of the interface hands 120 is arranged to face the back of each of the hands of the operator.

Since all of the first tactile finger 21 to the fifth tactile finger 25 have the same configurations, the first tactile finger 21 will be described below.

Figure 5:
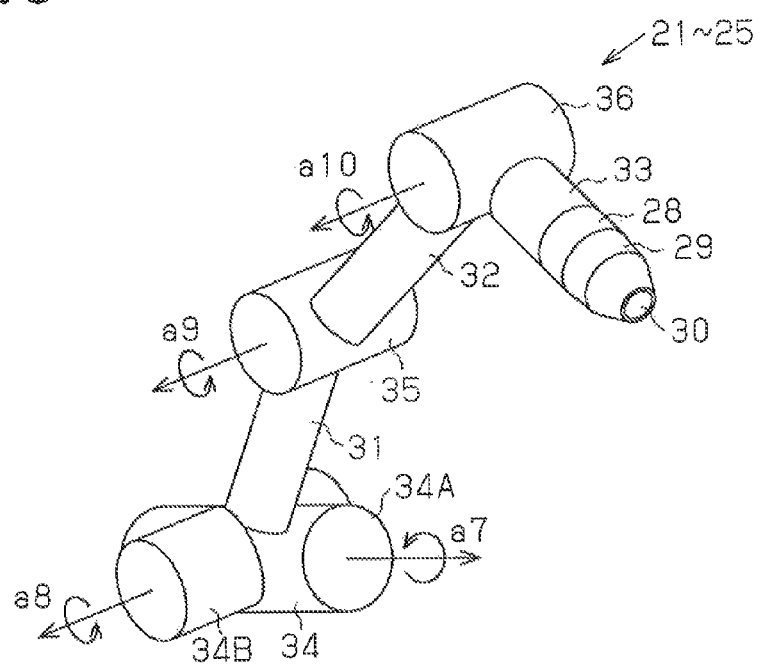
FIG. 5 is a view showing a principle of a tactile finger.

As shown in FIG. 5, the first tactile finger 21 includes a plurality of links 31 to 33 connected with each other via a plurality of joint portions. Specifically, the first link 31 is connected to the tactile finger base 16 via a joint portion 34. The joint portion 34 has a first joint 34A having an axis a7, and a second joint 34B having an axis a8. The first link 31 actively rotates about each of the axes a7 and a8 perpendicular to each other. The second link 32 is connected to the first link 31 via a third joint 35. The third joint 35 actively rotates about an axis a9. That is, the first to third joints 34A to 35 are respectively driven by drive motors and gear reducers. The first link 31 and the second link 32 rotate around each of the above described axes a7 to a9 by controlling each of the drive motors of the first to third joints 34A to 35.

The third link 33 is connected to the second link 32 via a fourth joint 36. The fourth joint 36 passively rotates about an axis a10. That is, the fourth joint 36 coordinates with the third joint 35 so that the fourth joint 36 moves together with the third joint 35. Further, according to the coordination, the rotation angle of the fourth joint 36 becomes equivalent to the rotation angle of the third joint 35.

Moreover, rotary encoders URE1 to URE3 as a rotation angle detection portion that detects rotation angles, namely, joint angles are provided in the drive motors of the first joint 34A, the second joint 34B, and the third joint 35. The rotation angles, namely, the joint angles about axes of the drive motors of the first to third joints 34A to 35 are detected by these rotary encoders.

Figure 7:
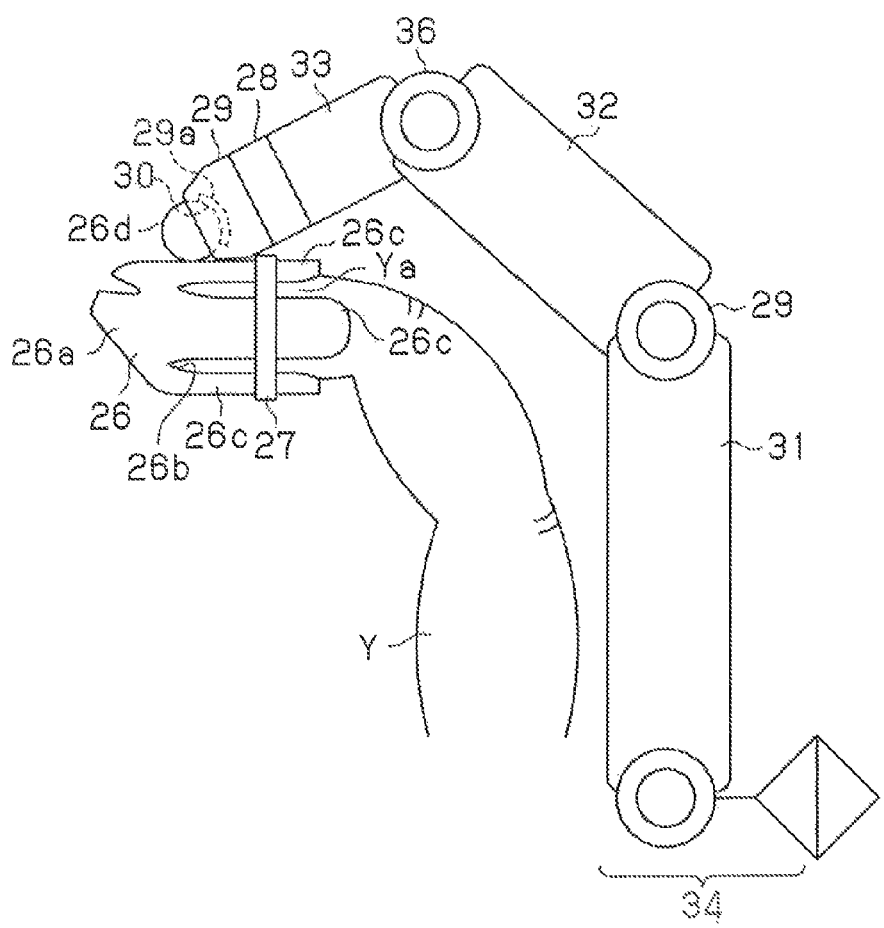
FIG. 7 is a view illustrating a state in which the finger holder is attached to a finger and connected with a tactile finger.

As shown in FIG. 5, a triaxial force sense sensor 28 is mounted on the third link 33. Translational force in three axial directions perpendicular to each other applied to distal ends of the tactile fingers 21 to 25 is sensed by the triaxial force sense sensor 28. Further, a semispherical recess 30 is formed in a distal end 29 of the third link 33. As shown in FIG. 7, a permanent magnet 29a as an attracting portion and a magnetic force generating portion is arranged in the recess 30.

Figure 6:
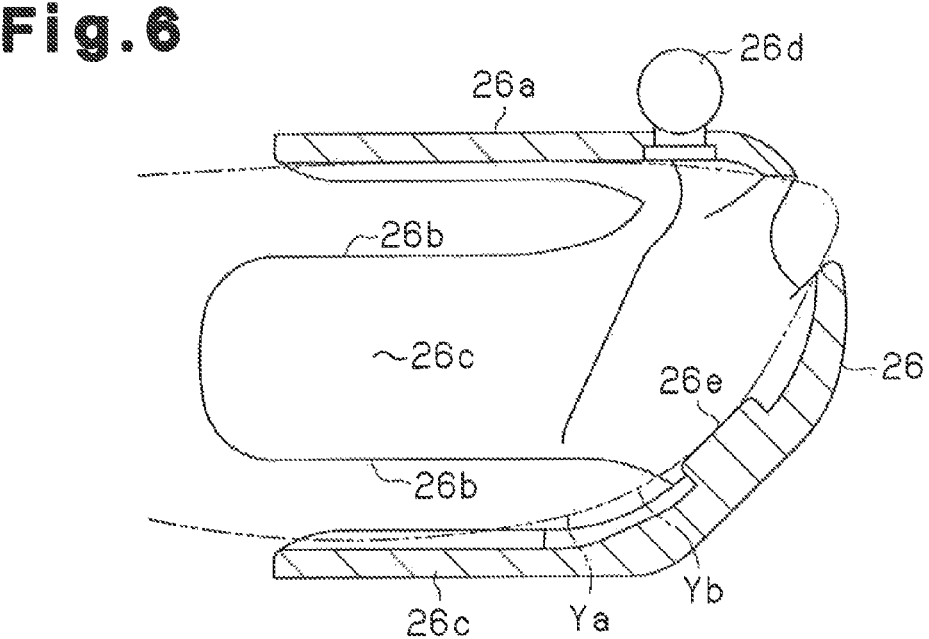
FIG. 6 is a cross-sectional view showing a finger holder.

As shown in FIG. 7, a finger holder 26 can be attached to the third link 33 of each of the tactile fingers 24 and 25. As shown in FIG. 6, the finger holder 26 is provided with cap-shaped holder portion 26a to hold a finger Ya of the operator H. A plurality of slits 26b, which extend from an opening to a distal end of the holder portion 26a, is formed in the holder portion 26a. The holder portion 26a includes a plurality of elastic pieces 26c formed by the slits 26b. Materials of the finger holder 26 are not limited and may be a plastic or a metal such as stainless steel.

As shown in FIG. 7, the finger holder 26 is fixed onto the finger Ya of the hand of the operator H by tightening a binding band 27 the outer surfaces of the elastic pieces 26c with the finger Ya inserted into the finger holder 26.

A joint ball 26d formed by a ferromagnet such as iron is fixed to the top of the distal end of the holder portion 26a. The joint ball 26d is received in a rollable manner in the recess 30 of the third link 33. The holder portion 26a is connected to each of the distal ends of the tactile fingers 21 to 25 via the joint ball 26d thereof in a rollable manner. A passive joint is configured by fitting the joint ball 26d into the recess 30. In the present embodiment, a finger attachment portion for attaching each of the tactile fingers 21 to 25 to the finger Ya is configured by the finger holder 26 and the joint ball 26d.

Since the joint ball 26d is a ferromagnet, the joint ball 26d can be connected to the third link 33 in a range of the magnetic force of the permanent magnet 29a in the recess 30. However, when tensile force beyond the magnetic force is applied to the joint ball 26d, the joint ball 26d can be released from the recess 30. Thus, joint ball 26d is detachable from the recess 30 and received in the recess 30 rotationally in any of a 360-degree range.

Accordingly, ten finger holders 26 mounted on the fingers Ya of both hands of the operator are coupled to the five tactile fingers 21 to 25 of the interface hand 120 in the interface 100A and the five tactile fingers 21 to 25 of the interface hand 120 in the interface 100B.

Further, as shown in FIG. 6, a protrusion 26e is formed on a portion of the inner surface of each of the finger holders 26 that contacts a ball portion Yb of the finger Ya. According to the protrusion 26e, when force is applied to the finger holder 26, the force is concentrated on and applied to the ball portion Yb of the finger Ya of the operator H.

In the present embodiment, as shown in FIG. 1, the operator H is connected to the interfaces 100A and 100B via the interface hands 120. In this case, the arrangement relationship between the fingers Ya of the operator H and the tactile fingers 21 to 25 of the interface hand 120 is as shown in FIG. 7. Assuming that the tactile fingers 21 to 25 are mechanisms of three joint and three-degree-of-freedom, when the operator H flexes the fingers Ya, interference between the tactile fingers 21 to 25 and the fingers Ya is likely to be caused. For this reason, in the tactile fingers 21 to 25 of the present embodiment, the number of the joints is increased as described above to be four-joint mechanism including the axes a8 to a10 as shown in FIGS. 5 and 7. Accordingly, interference with respect to the fingers Ya of the hand when the tactile fingers 21 to 25 are flexed is reduced to a large extent. Further, in the present embodiment, a mechanism of four-joint and three-degree-of-freedom in which redundant degree-of-freedom is not necessary is used.

<Description of Electric Configuration>

Next, an electric configuration of the device regarding the interface 100A will be described with reference to FIG. 8.

Figure 8:
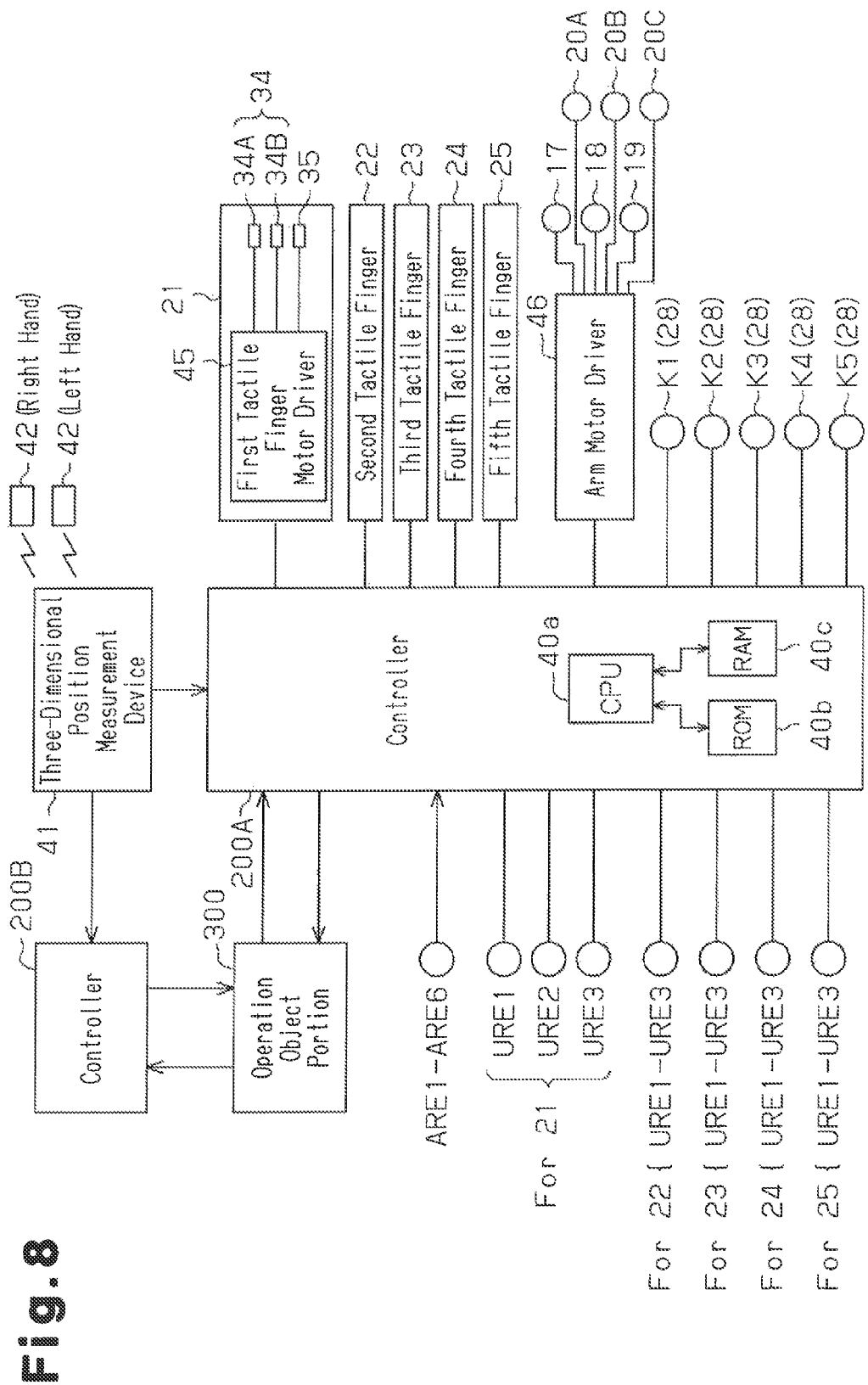
FIG. 8 is an electric block diagram of the force sense providing system.

A three-dimensional position and posture measurement device 41 shown in FIG. 8 can wirelessly communicate with three-dimensional position and posture sensors 42 mounted on the wrists R of the right and left hands of the operator H, who operates the interface 100A. In the present embodiment, the three-dimensional position and posture sensors 42 are attached to the wrists R. The three-dimensional position and posture sensors 42, which measure the position and the posture of the hand of the operator, may be attached to a palm of the interface hand 120 of the operator H. The three-dimensional position and posture sensors 42 correspond to a first detection portion.

In FIG. 1, only one three-dimensional position and posture sensor 42 is illustrated. The three-dimensional position and posture sensor 42 detects the position (three-dimensional spatial position) of the hand Ha of the operator H, and its posture. Detection signals obtained therefrom are wirelessly transmitted to the three-dimensional position and posture measurement device 41.

When the three-dimensional position and posture measurement device 41 receives the detection signals transferred from each of the three-dimensional position and posture sensors 42, the signals are processed as positional data regarding the position of the hand Ha and posture data regarding its posture to be supplied to the controller 200A.

Next, the controller 200A will be described.

The controller 200A is configured by a computer, and includes a central processing unit (CPU) 40a, a ROM 40b, and a RAM 40c. Various control programs such as a control program for controlling the interface 100A are stored in the ROM 40b. RAM 40c is a working memory for the CPU 40a performing computation, and stores various computation results and detection values obtained by performing the various control programs.

A first tactile finger motor driver 45 is communicatively and electrically connected with the controller 200A. The first tactile finger motor driver 45 drives the drive motor of each of the joints, namely, the joint portion 34 including joints 34A and 34B of the first tactile finger 21 and the joint 35 including the axis a10 on the basis of a motor operation command value of the first tactile finger 21 from the controller 200A.

The second tactile finger 22 to the fifth tactile finger 25 also includes drive devices as the first tactile finger 21 does, which drive each of the joints 34 and 35 on the basis of a second tactile finger control signal to a fifth tactile finger control signal from the controller 200A. In FIG. 8, for convenience of illustration, only the first tactile finger motor driver 45 of the first tactile finger 21 is shown. The drive devices and the joint portions 34 and 35 regarding the other tactile fingers 22 to 25 are omitted.

As shown in FIG. 8, an arm motor driver 46 is communicatively and electrically connected with the controller 200A. The arm motor driver 46 drives the drive motor of each of the joints of the arm mechanism 110, namely, the first joint 17 to the sixth joint 20C on the basis of motor operation command values for an arm from the controller 200A.

As described above, the interface 100A of the present embodiment includes six drive motors and six rotary encoders for the arm mechanism 110 and three drive motors and three rotary encoders for each of the tactile fingers 21 to 25. In the whole interface hand 120, fifteen drive motors and fifteen rotary encoders are provided. Further, the interface 100A of the present embodiment includes one of the triaxial force sense sensors 28 on the distal end of each of the tactile fingers 21 to 25. In the whole interface hand 120, five triaxial force sense sensors 28 are mounted. In FIG. 8, reference numerals K1 to K5 are assigned to the triaxial force sense sensors 28 of the first tactile finger 21 to the fifth tactile finger 25, respectively.

The detection signals from the rotary encoders and the detection signals of the triaxial force sense sensors 28 are supplied to the controller 200A via signal amplifiers that are not shown. Accordingly, the controller 200A obtains angles of each joint of the arm mechanism 110 and each joint of each of the tactile fingers 21 to 25, and the force on the distal end of each of the tactile fingers 21 to 25.

The controller 200A supplies various ones of the motor operation command values to the motor driver 45 for the tactile fingers 21 to 25, and the arm motor driver 46 to control each of the drive motors. Thereby, the movement of the force sense interface is controlled by the controller 200A.

<Interface 100B>

Since the controller 200B for the interface 100B has the same configuration as that of the controller 200A, the description thereof is omitted. Accordingly, the controller 200B controls the interface 100B with the same configuration as that of the interface 100A as well as the controller 200A does.

<Operation Object Portion 300>

Next, the operation object portion 300 will be described. The operation object portion 300 is configured by a slave robot including a hand shaped as that of a person and a slave robot controller therefor (hereinafter, referred to as the robot controller). The slave robot includes a drive source for the drive motors, joint angle sensors such as the rotary encoders, and the triaxial force sense sensors attached to the distal ends of the fingers.

The above described various sensors are connected to the robot controller via the signal amplifiers that are not shown.

Further, the drive source is connected to the robot controller via the motor driver. The robot controller and the controllers 200A and 200B are communicatively connected with each other via LAN or wireless LAN. Target command values are supplied from the controllers 200A and 200B to the robot controller. The slave robot with the hand shaped as that of a person is controlled in accordance with the target command values. In contrast, position information and force information of the slave robot with a hand shaped as that of the person is supplied from the robot controller to the controllers 200A and 200B.

Next, the operation of the force sense interface will be described.

In the following description, variables expressed with bold in equations are directed to vectors or matrices. In the description, the variables are described without bold. Indices at a top or a bottom are described with parentheses ( ). In notations of the equations, one dot on the variables expresses first-order temporal differentiation.

As shown in FIGS. 1 and 7, the interface hands 120 of the interfaces 100A and 100B are mounted on the right and left hands of the operator H such that the interface hands 120 are arranged to face the backs of the hands.

When the operator H moves the hands freely after the interface hands 120 are mounted on the hands, respectively, the operation object portion 300 is controlled by the controllers 200A and 200B to perform operations corresponding to the positions and the postures of the hands Ha.

At this time, the force sense interface is controlled by the controllers 200A and 200B such that the operator H can freely move the hands.

Hereinafter, the operation will be specifically described.

<Control by the Controllers 200A and 200B>

The controllers 200A and 200B perform control of the tactile fingers 21 to 25, and control of the arm mechanism 110 at a predetermined control cycle. That is, the controllers 200A and 200B compute the motor operation command values of the drive motors mounted on the tactile fingers 21 to 25 and the motor operation command values of the drive motors mounted on the arm mechanism 110 to supply the computed motor operation command values to the motor drivers 45 and 46. The motor drivers 45 and 46 drive corresponding one of the drive motors in accordance with the command values. Here, the tactile fingers 21 to 25 are controlled according to the motor operation command values such that fingertip force applied to the ball portions of the fingers by the interface becomes target force. Each arm of the arm mechanism 110 is controlled according to the motor operation command values such that the evaluation function PI becomes maximized. The evaluation function PI will be described below.

<Control of the Tactile Fingers 21 to 25>

The controllers 200A and 200B perform control of the tactile fingers 21 to 25 at a predetermined control cycle in accordance with control laws of the tactile fingers 21 to 25, which will be described below.

$$\tau_F(t) = K_1 J_F^T F_e(t) + K_2 J_F^T \int_0^t F_e(s) ds - K_3 \dot{q}_f(t) + g_F + J_F^T F_d, \quad (1)$$

where $$\Sigma_F = [\Sigma_{F1}^T, \ldots, \tau_{F5}^T]^T \epsilon R^{15}$$

$\tau_{Fi} \epsilon R^3$ is an input torque to the i-th tactile finger. The value of power of R shows the number of dimensions of space (the same shall apply, hereinafter). T shows a transposed matrix (the same shall apply, hereinafter). The variant i of the i-th tactile finger is i=1, 2, 3, 4, 5. The variant t shows time. Further, the variant s is an integration variable.

$$J_F = \text{block diag}[J_{F1}, \ldots, J_{F5}]$$

$J_{Fi} \in R^{3\times 3}$ is a Jacobian matrix of the i-th tactile finger. "block diag" shows an on-diagonal element.

$$F_e = F_d - F$$

$$F = [F_1^T, \ldots, F_5^T] \in R^{15}$$

$F_i \in R^3$ shows finger tip force of the i-th tactile finger (namely, a value of the triaxial force sense sensor).

$$F_d = [F_{d1}^T, \ldots, F_{d5}^T] \in R^{15}$$

$F_{di} \in R^3$ is target fingertip force of the i-th tactile finger.

$$q_F = [q_{F1}^T, \ldots, q_{F5}^T] \in R^{15}$$

$q_{Fi} \in R^3$ is a joint angle of the i-th tactile finger.

$K_i$ is a positive feedback gain. The variant i of the $K_i$ is i=1, 2, 3.

$g_F$ is a gravity compensation term.

In the equation (1), the first term and the second term on the right side are proportional-integral control terms of the force. The third term is a viscous term for giving stability. The fourth term is a compensation term that negates the influence of the gravity. The fifth term is a feedforward term of the target force. When the controllers 200A and 200B follow the control laws, the tactile fingers 21 to 25 move such that the fingertip force $F \rightarrow F_d$. When the $F_d$ is equal to zero, the operation command values of the motor drivers of the tactile fingers 21 to 25 necessary to set the values of the triaxial force sense sensors 28 to be zero are computed.

<Control of the Arm Mechanism 110>

The controllers 200A and 200B perform control of the tactile fingers 21 to 25 and control of the arm mechanism 110 at a predetermined control cycle in accordance with control laws of the arm mechanism 110, which will be described below.

$$\tau_A(t) = K_{A1}(q_{Ad} - q_A) + K_{A2}(\dot{q}_{Ad} - \dot{q}_A) + g_A + J_A^T \begin{pmatrix} \sum_{l=1}^{5} F_{di} \\ \sum_{l=1}^{5} p_{Fi} \times F_{di} \end{pmatrix}, \quad (2)$$

where $$\tau_A = [\tau_{A1}, \ldots, \tau_{A6}]^T \in R^6$$

$\tau_{Ai}$ is an input torque to the i-th joint of the arm.

$J_A$ is a Jacobian matrix of the arm.

$F_{di} \in R^3$ is target fingertip force of the i-th tactile finger. The variant i of the i-th tactile finger is i=1, 2, 3, 4, 5.

$p_{Fi} \in R^3$ is a positional vector from a hand base to the fingertip of the i-th tactile finger.

$$q_A = [q_{A1}, \ldots, q_{A6}] \in R^6$$

$q_{Ai}$ is a joint angle of the i-th joint of the arm. The variant i of the i-th joint is i=1, 2, 3, 4, 6.

$$q_{Ad} = [q_{Ad1}, \ldots, q_{Ad6}] \in R^6$$

$q_{Adi}$ is a target joint angle of the i-th joint of the arm.

$K_{Ai}$ is a positive feedback gain. The variant i here is i=1, 2.

$g_A$ is a gravity compensation term.

In the equation (2), the first term and the second term on the right side are Proportional-Derivative Control (PD control) terms of the joint angle of the arms. The third term is a compensation term that negates the influence of the gravity. The fourth term is a compensation term of external force received by the fingertips of the tactile fingers 21 to 25.

When the controllers 200A and 200B follow the control laws, the arms 11 to 15 of the arm mechanism 110 move such that the joint angles $q_A$ of the arms 11 to 15 is $q_A \rightarrow q_{Ad}$. The $q_{Ad}$ is selected such that the evaluation function PI becomes maximized.

Thereby, the positions and the postures of the arms 11 to 15 are controlled such that the joints of each of the tactile fingers 21 to 25 improves manipulability of the interface hand 120 within a moveable range, a change in the joint angles of the arms 11 to 15 is reduced, and interference between the interfaces 100A and 100B is avoided.

<Evaluation Function PI>

Next, the evaluation function PI will be described.

In order to avoid the interference or collision between the interfaces 100A and 100B and the operator H, the controllers 200A and 200B control the interfaces 100A and 100B according to an interference avoidance method. As the interference avoidance method, the positions of the arms 11 to 15 are controlled to set target values of the positions and the postures of the arms 11 to 15 such that the evaluation function PI, which is the sum of a penalty function of the manipulability of the interface hand 120 and the interference, becomes maximized.

The evaluation function PI of the interference is configured by a difference between the positions of the wrists of the operator H and the positions of the wrists of the interfaces 100A and 100B, namely, the positions of the wrists of the interface hands 120. For example, the following equations are illustrated as the evaluation function PI.

$$PI = \sum_{i=1}^{5} (\alpha_i \ W_i + \beta_i \ P_i) + Q_A + D_A \quad (3)$$

where, $\alpha_i$ and $\beta_i$ are weight coefficients of i-th finger in which $W_i$ shows manipulability of the i-th finger. $W_i$ is obtained by the following equation (4) when kinematics Jacobian matrix thereof is expressed by J.

$$W_i = |\det J_i| \quad (4)$$

When the $W_i$ becomes greater, the manipulability of the tactile fingers 21 to 25, i.e., the ease of the movement is improved. $P_i$ is a penalty function of the i-th finger given to settle the joints of the fingers in a movable range, which is obtained by the following equation (5).

$$P_i = -\Sigma_j k_j [\exp\{-l(q_{ij} - a_{ij})\} + \exp\{l(q_{ij} - b_{ij})\}] \quad (5)$$

In the equation (5), $a_{ij}$ and $b_{ij}$ show movable limits of the rotation of a j-th joint of the i-th finger in a right-left direction. $k_i$ is a weight coefficient of the i-th finger and l is a coefficient for adjusting the shape of an exponential function.

$Q_A$ is a term for evaluating a change amount of a joint angle vector $q_a$ of the arm.

$$Q_a = -\frac{1}{2}(q_a - q_{a0})^T \Gamma (q_a - q_{a0}) \quad (6)$$

In the equation (6), $q_{ao}$ is an arm joint angle vector in early stages of calculation. $\Gamma$ is a weighting matrix. When the positions of the arms 11 to 15 are controlled such that the manipulability of the interface hand 120 becomes maximized, the arms 11 to 15 are moved greatly in response to slight movements of the fingers of the operator H, giving a sense of uneasiness to the operator. To solve this problem, the second term of the above described equation (3) is introduced.

$D_A$ is a penalty function for avoiding the interference or the collision between the interfaces 100A and 100B and operator H, which will be obtained by the following equation (7).

$$D_A = -\sigma\left(1 - \frac{1}{1 + \exp(-(x-\gamma)/\eta)}\right) \quad (7)$$

$\sigma$, $\gamma$, and $\eta$ are weight coefficients. x is a distance between the position of the wrist of the operator H and the position of the wrist of the interface hand 120, i.e., the position of the wrist of the arm mechanism 110. The penalty function $D_A$ of the interference is configured by the position of the wrist of the operator H and the position of the wrist of the interface hand 120 as described above.

According to evaluation terms in the equation (3), the positions and the postures of the arms 11 to 15 are controlled such that the joints of each of the tactile fingers 21 to 25 improve the manipulability of the interface hand 120 in the moveable range, the change in the joint angles of the arms 11 to 15 is reduced, and the interference between the interfaces 100A and 100B is avoided. Thereby, the positions and the postures of the arms 11 to 15 are not greatly moved by the slight movement of the fingers of the operator H, giving a sense of easiness to the operator. Also, the manipulation performance of the interface hand 120 is improved while the interference is avoided. Accordingly, the force sense is provided with high accuracy.

<When Interference Force is Input from the Operation Object Portion 300>

When operating a certain object by operating the operation object portion 300 remotely, the controllers 200A and 200B obtain interference force, namely force information, generated between the operation object portion 300 and the object by the triaxial force sensor that is not shown.

The interference force is provided to the operator H of the force sense interface. That is, the motor operation command values for allowing each of the tactile fingers 21 to 25 of the interface hand 120 mounted on the hands to provide the force sense in a direction in which the interference force is applied are computed by the controllers 200A and 200B. The computed motor operation command values are supplied from the controllers 200A and 200B to the corresponding interfaces 100A and 100B via the corresponding motor driver 45 and the arm motor driver 46.

At this time, the controllers 200A and 200B perform the interference avoidance method to avoid the interference between the interfaces 100A and 100B and the operator H.

As described above, the operator H achieves the remote operation of the operation object portion 300 using the force sense interface.

The present embodiment provides the following advantages.

(1) The force sense interface of the present embodiment includes a tactile finger base 16, an arm mechanism 110, and controllers 200A and 200B. The tactile finger base 16 includes a plurality of tactile fingers 21 to 25, which can follow movement of fingers of a hand of an operator H. The arm mechanism 110 enables spatial movement of the tactile finger base 16. The controllers 200A and 200B coordinate with positions and postures of the hand of the operator H to drive and control the arm mechanism 110, and coordinate with the movement of fingertips of the operator H to control the first tactile fingers 21 to 25.

The force sense interface includes the tactile fingers 21 to 25, finger holders 26, and joint balls 26d. In a state in which the tactile finger base 16 is spaced apart from the back of the hand of the operator H and faces the back, the finger holders 26 are provided on the tactile fingers 21 to 25, respectively. The finger holders 26 are attached to the fingers of the operator H.

As a result, in a state in which the tactile fingers 21 to 25 and the tactile finger base 16 are spaced apart from the back of the hand of the operator H, an interface hand 120 can be attached to the fingers of the operator H. Accordingly, operational space where arms 11 to 15 move is formed to be large. Further, a three-dimensional force sense and a sense of weight of a virtual object are provided to each of the fingers of a person without giving a sense of oppression and a sense of weight of the device, and a small virtual object can be treated safely. For example, in a state in which the tactile fingers 21 to 25 are attached to the fingers via the finger holders 26, a grasping operation of a small object can be performed.

The present embodiment is different from that of a wearable device in that the interfaces 100A and 100B are provided on ground. Accordingly, a sense of weight of a virtual object can be provided.

(2) The controllers 200A and 200B of the force sense interface compute evaluation function PI for avoiding interference between a wrist of the operator H and a wrist of the arm mechanism 110 except for the finger holders 26 (finger attachment portion) based on detection results of the triaxial position and posture sensor 42 (first detection portion) and joint angles of each arm of the arm mechanism 110. The controllers 200A and 200B control the arm mechanism 110 on the basis of the computation result of the evaluation function PI. As a result, on the basis of the computed result of the evaluation function PI, interference between the arm mechanism 110 and a hand Ha of the operator H is avoided. That is, the evaluation function PI for avoiding the interference between the wrist of the arm mechanism 110 and the wrist of the operator H is computed such that the interference between the wrist of the arm mechanism 110 and the wrist of the operator H is avoided. As a result, not only interference between the arm mechanisms 110 and an arm of the operator H is avoided but also interference between the interfaces 100A and 100B including the arm mechanism 110 and the interface hands 120 and the operator H including the hands and the arms is avoided.

(3) By controlling the arm mechanism 110 such that the evaluation function becomes maximized, interference between the arm mechanism 110 and the hand Ha of the operator H is avoided.

(4) The protrusion 26e provided on the finger holder 26 contacts the ball portion Yb of a finger Ya of the operator H such that force is concentrated and applied onto the ball portion Yb of the finger Ya. Accordingly, a clear three-dimensional force sense is provided to the ball portion Yb of the finger Ya of the operator H such that the force sense on the ball portion Yb of the finger Ya becomes similar to the actual force sense.

(5) The finger attachment portion includes the rollable joint balls 26d provided on distal portions of the tactile fingers 21 to 25, and holder portions 26a connected to the joint balls 26d mounted on the fingertips of the operator H. As a result, according to the joint ball 26d, the posture of the fingertip is changed at the same fingertip position. Accordingly, each of the tactile fingers 21 to 25 is smoothly coupled with the operator H.

(6) A permanent magnet 29a (attracting portion), which holds the joint ball 26d on each of the tactile fingers 21 to 25 by attracting force, is provided. The permanent magnet 29a attracts, or draws, and holds the joint ball 26d. When excess tensile force is applied to the fingertip of the operator H, the joint ball 26d is automatically released from each of the tactile fingers 21 to 25 such that the tensile force is not applied to the fingertip of the operator H. Accordingly, the connection between each of the tactile fingers 21 to 25 and the finger holder 26d is securely released such that the operator H can operate the sense force interface with a sense of ease.

(7) The permanent magnet 29a functions as a magnetic force generating portion for holding the joint ball 26d by drawing the joint ball 26d with magnetic force. As a result, the above described advantage (6) is obtained by applying the magnetic force to the joint ball 26d.

(8) A three-dimensional force sense is provided to the fingers of each of the hands by providing two side-type multi-finger force sense interfaces on both sides of the operator H. Thereby, in a remote control and a virtual environment, a force sense providing device, which enables delicate, elaborate, and adroit operations using fingers of both hands is provided.

The present embodiment may be modified as follows.

The force sense providing system of the above embodiment includes a pair of the interfaces 100A and 100B and a pair of the controllers 200A and 200B. Alternatively, the force sense providing system may be configured by only the interface 100A and the controller 200A or by only the interface 100B and the controller 200B. In this case, the force sense providing system is directed to a force sense providing system for the right hand of the operator H or for the left hand of the operator H.

Although five of the tactile fingers 21 to 25 are provided on the tactile finger base 16, the number of the tactile fingers is not limited and may be any of one to four.

Although the tactile fingers 21 to 25 have four joints and three degrees of freedom, they are not limited to this, and may include four or greater degrees of freedom.

An electromagnet may be used in lieu of the permanent magnet 29a as the attracting portion. Further, one or greater number of suction holes may be formed in the recess 30 such that air is drawn via the suction holes to attract the joint ball 26d. In this case, the suction holes formed in the recess 30 and a device for drawing the air such as a vacuuming device correspond to the attracting portion.

Although the arm mechanism 110 includes six degrees of freedom, the number of degrees of freedom is not limited to six. The arm mechanism 110 may include seven or greater number of degrees of freedom.

The invention claimed is:

1. A side-type force sense interface provided on a side of an operator, which provides a force sense to each of fingers of the operator, the interface comprising:
    a tactile finger base having one to five tactile fingers, which can follow movement of the fingers of the operator;
    an arm mechanism, which enables spatial movement of the tactile finger base;
    a controller that controls the arm mechanism in accordance with a position and a posture of a hand of the operator and controls the tactile fingers in accordance with movement of the fingers of the operator;
    a first detection portion, which detects a position and a posture of a wrist of the operator, the arm mechanism having a wrist joint corresponding to the wrist of the operator; and
    a second detection portion, which detects a position and a posture of the wrist joint of the arm mechanism, wherein
    one to five finger attachment portions are provided on the tactile fingers, wherein the finger attachment portions are attached to the fingers of the operator in a state in which the tactile fingers and the tactile finger base face the back of the hand of the operator and are spaced apart from the back, and
    based on a detection result of the first detection portion and a detection result of the second detection portion, the controller computes an evaluation function for avoiding physical interference between the wrist of the operator and the wrist joint of the arm mechanism except for the finger attachment portions and controls the arm mechanism on the basis of a computation result of the evaluation function.

2. The side-type force sense interface according to claim 1, wherein the controller controls the arm mechanism such that the evaluation function becomes maximized.

3. The side-type force sense interface according to claim 1, wherein each finger attachment portion includes a part that is brought into contact with a ball portion of each of the fingers of the operator, wherein a protrusion is formed on the part in contact with the ball portion of each of the fingers such that force is applied to the ball portion of each of the fingers in a concentrated manner.

4. The side-type force sense interface according to claim 1, wherein each finger attachment portion includes a rollable joint ball provided on a distal portion of each of the tactile fingers, and a finger holder connected to the joint ball and to a fingertip of the operator.

5. The side-type force sense interface according to claim 4, wherein an attracting portion, which holds the joint ball by attraction, is provided in each of the tactile fingers.

6. The side-type force sense interface according to claim 5, wherein each attracting portion includes a magnetic force generating portion, which holds the joint ball by attracting the joint ball with magnetic force.

7. A side-type force sense interface including a first force sense interface and a second force sense interface provided on each of sides of an operator, each of which provides a force sense to fingers of a hand of the operator, wherein
    the first force sense interface is for the right hand of the operator, and the second force sense interface is for the left hand of the operator,
    each of the first and the second force sense interfaces includes:
        a tactile finger base having one to five tactile fingers, which can follow movement of the fingers of the operator;
        an arm mechanism, which enables spatial movement of the tactile finger base;
        a controller that controls the arm mechanism in accordance with a position and a posture of the corresponding hand of the operator, and controls the tactile fingers in accordance with movement of the corresponding fingers of the operator;
        a first detection portion, which detects a position and a posture of a wrist of the operator, the arm mechanism having a wrist joint corresponding to the wrist of the operator; and a second detection portion, which detects a position and a posture of the wrist joint of the arm mechanism, wherein one to five finger attachment portions are provided on the tactile fingers, wherein the finger attachment portions are attached to the fingers of the operator in a state in which the tactile fingers and the tactile finger base face the back of the corresponding hand of the operator and are spaced apart from the back, and based on a detection result of the first detection portion and a detection result of the second detection portion, the controller computes an evaluation function for avoiding physical interference between the wrist of the operator and the wrist joint of the arm mechanism except for the finger attachment portions and controls the arm mechanism on the basis of a computation result of the evaluation function.

\* \* \* \* \*